United States Patent Office 2,831,848
Patented Apr. 22, 1958

2,831,848

METALLIFEROUS AZO-DYESTUFFS

Henri Riat, Arlesheim, and Raymond Gunst, Binningen, Switzerland, assignors to Ciba Limited, Basel, Switzerland, a Swiss firm No Drawing. Application March 12, 1954
Serial No. 415,945

Claims priority, application Switzerland
December 21, 1951

17 Claims. (Cl. 260—146)

This is a continuation-in-part of copending application Serial No. 327,031, filed December 19, 1952 (now abandoned).

According to this invention valuable new metalliferous azo-dyestuffs are made by treating a dyestuff corresponding to the general formula (1) 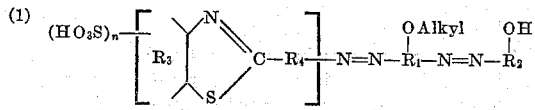

in which $R_1$ represents an aromatic radical containing at the most ten nuclear carbon atoms and only six-membered carbocyclic rings to which radical the two azo linkages are bound in para-position relatively to one another and the —O-alkyl group is bound in ortho-position relatively to —N=N—$R_2$, $R_2$ represents a naphthalene radical to which the azo group is bound in ortho-position relatively to the OH-group, $R_3$ represents a benzene radical fused on to the thiazole ring in the manner indicated, $R_4$ represents a benzene radical bound to the azo linkage in para-position relatively to the bond connecting $R_4$ to the thiazole ring and $n$ represents a whole number of at the most 2, with an agent yielding nickel or copper under conditions such that with splitting off of the alkyl group from the O-alkyl radical an ortho:ortho-dihydroxy-azo-metal complex is formed.

The dyestuffs of the Formula 1 can be made by coupling a diazo compound of an amine of the formula (2) 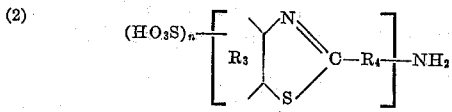

with a middle component of the formula (3) 

diazotizing the resulting amino-monoazo-dyestuff of the constitution (4) 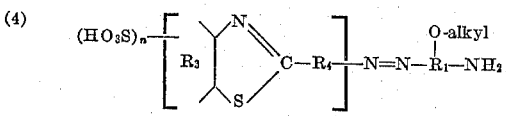

and coupling the diazo-azo-compound with an end component of the formula (5) 

$R_1$, $R_2$, $R_3$ and $n$ in the above formulae have the meanings given above in connection with Formula 1.

The initial compound of the Formula 2 may contain further substituents, for example, halogen atoms such as chlorine, methoxy or ethoxy groups, but especially methyl groups.

Owing to their ready accessibility and the good results obtained therewith, there come into consideration as initial components above all the mono- and disulfonic acids of 2-(4'-aminophenyl)-6-methyl-benzthiazole (dehydrothiotoluidine).

As examples of initial components there may be mentioned:

2 - (4' - aminophenyl) - 6 - methylbenzthiazole monosulfonic acids, for example, 2-(4'-aminophenyl-6-methylbenzthiazole-x-sulfonic acid obtainable by sulfonating 2-(4'-aminophenyl)-6-methylbenzthiazole with concentrated sulfuric acid; or 2-(4'-aminophenyl)-6-methylbenzthiazole-3'-sulfonic acid obtained by the thermal rearrangement of the acid sulfate of 2-(4'-aminophenyl)-6 - methylbenzthiazole; 2 - (4' - aminophenyl) - 6 - methylbenzthiazole disulfonic acids, for example, that which is obtained by thermal rearrangement of the acid sulfate of 2 - (4' - aminophenyl) - 6 - methylbenzthiazole monosulfonic acid obtained by sulfonation with concentrated sulfuric acid from 2-(4'-aminophenyl)-6-methylbenzthiazole; and also 2-(4'-aminophenyl)-benzthiazole-X-sulfonic acid, 2-(4'-aminophenyl)-5-chlorobenzthiazole - X - sulfonic acid, 2 - (4' - aminophenyl)-5 - methyl - benzthiazole - X - sulfonic acid, 2 - (4'-aminophenyl) - 6 - chloro - benzthiazole - X - sulfonic acid, 2 - (4' - aminophenyl) - 6 - methoxy - benzthiazole-X - sulfonic acid, 2 - (4' - aminophenyl) - 6 - ethoxybenzthiazole-X-sulfonic acid, which all may be obtained by sulfonating the corresponding thiazoles.

The middle components of the Formula 3 are of the naphthalene series or of the benzene series. They contain an alkoxy group preferably of low molecular weight, advantageously a methoxy group, which is in ortho-position relatively to the —$NH_2$ group. As examples of suitable middle components the following compounds may be mentioned: 1-amino-2-methoxybenzene, 1-amino-2 - methoxy - 5 - methylbenzene, 1 - amino - 2 - methoxynaphthalene-6- or -7-sulfonic acid, 1-amino-2-ethoxynaphthalene-6- or -7-sulfonic acid.

As end components of the Formula 5 there are used hydroxynaphthalenes coupling in ortho-position to the hydroxyl group, preferably hydroxynaphthalene sulfonic acids, and among the latter those containing an amino group in addition to the hydroxyl group and the sulfonic acid group lead to particularly valuable results.

The end components may for instance be selected from the following groups of hydroxynaphthalenes:

(a) 2-hydroxynaphthalene or preferably hydroxynaphthalene-sulfonic acids which contain no further substituents, such as 1-hydroxynaphthalene-3-, -4- or -5-sulfonic acid, 1 - hydroxynaphthalene-3:6-disulfonic acid, 1-hydroxynaphthalene-3:8-disulfonic acid, 2-hydroxynaphthalene-4-, -5-, -6- or -7-sulfonic acid, 2-hydroxynaphthalene-3:6-disulfonic acid.

(b) 1-hydroxynaphthalene-3-sulfonic acids which contain in one of the two β-positions of the 6-membered ring not containing the sulfonic acid and hydroxyl group an amino group, which may be substituted. Usually these compounds are not designated as 6- or 7-amino-1-hydroxynaphthalene-3-sulfonic acids but as 2-amino-5-hydroxynaphthalene-7-sulfonic acids or 2-amino-8-hydroxynaphthalene-6-sulfonic acids. The amino group may, for example, be a phenylamino group, which may contain substituents, or a mono- or di-alkylamino group, an alkylphenylamino group or an acylamino group.

Of special interest are the dyestuffs which have been made from a 2-amino-8-hydroxynaphthalene-6-sulfonic acid, for example, this acid itself or advantageously its N-substitution products. Among the latter especially valuable dyestuffs are obtained with those which contain a phenylamino group, and advantageously one which contains in the phenyl radical a group imparting solubility, for example, a sulfonic acid or carboxylic acid group.

The following compounds may be mentioned as examples of end components:

2-amino-5-hydroxynaphthalene-7-sulfonic acid,
2-acetylamino-5-hydroxynaphthalene-7-sulfonic acid,
2-benzoylamino-5-hydroxynaphthalene-7-sulfonic acid,
2-phenylamino-5-hydroxynaphthalene-7-sulfonic acid,
2-(4'-carboxymethoxyphenylamino) - 5 - hydroxynaphthalene-7-sulfonic acid,
2-amino-8-hydroxynaphthalene-6-sulfonic acid,
2-acetylamino-8-hydroxynaphthalene-6-sulfonic acid,
2-benzoylamino-8-hydroxynaphthalene-6-sulfonic acid,
2-$\beta$-hydroxyethylamino - 8 - hydroxynaphthalene - 6 - sulfonic acid,
2-methylamino-8-hydroxynaphthalene-6-sulfonic acid,
2-phenylamino-8-hydroxynaphthalene-6-sulfonic acid,
2-(N-methyl-phenylamino) - 8 - hydroxynaphthalene - 6-sulfonic acid,
2-phenylamino-8-hydroxynaphthalene-6-sulfonic acid - 3'- or -4'-carboxylic acid,
2-phenylamino-8-hydroxynaphthalene-6:3' - or - 6:4' - disulfonic acid,
2-phenylamino-8-hydroxynaphthalene-6-sulfonic acid-3'-sulfonic acid amide,
2-(4' - carboxymethoxyphenylamino) - 8 - hydroxynaphthalene-6-sulfonic acid,
2-[4'-(8''-hydroxynaphthyl-[2''] - aminophenyl)] - 6-methylbenzthiazole-X:6''-disulfonic acid, i. e. the compound of the formula

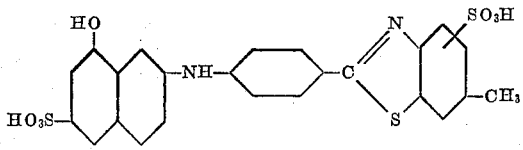

(c) 1-aminohydroxynaphthalene sulfonic acids which may contain two or preferably one sulfonic acid group. The amino group may be free or substituted in any desired manner. There may be used, for example, mono- or dialkylamino groups with alkyl radicals of low molecular weight, such as ethyl or methyl, aryl, especially phenylamino groups, alkylphenylamino groups, mono- or di-(oxyalkyl)-amino groups, such as mono- or di-($\beta$-hydroxyethyl)-amino groups, acylamino groups, such as the acetylamino group, the benzoylamino group, or the $\beta$-chlorobenzoylamino group.

Particularly good results are obtained with 1-amino-8-hydroxy-naphthalene-4-sulfonic acid, especially those carrying an additional substituent at the nitrogen atom, for example the acylated 1-amino-8-hydroxynaphthalene-4-sulfonic acid.

In this connection, the following end components may be mentioned: 1-amino-8-hydroxynaphthalene-4-sulfonic acid, 1-amino-8-hydroxynaphthalene-2,4-disulfonic acid, 1-acetylamino-8-hydroxynaphthalene-4-sulfonic acid, 1-benzoylamino-8-hydroxynaphthalene-4-sulfonic acid.

It is desirable so to choose the starting materials that the resulting disazo-dyestuff contains at least two groups imparting solubility, for example, two sulfonic acid groups or a sulfonic acid group and a carboxylic acid group.

In making the disazo-dyestuffs of the Formula 1 the coupling of the diazotized initial component with the middle component is in general carried out with advantage in a weakly acid to weakly alkaline medium, for example, an acetic acid to alkali bicarbonate alkaline medium. If the middle component has a low capacity for coupling it is generally of advantage to couple it in the form of its $\omega$-methane sulfonic acid, and to split off the $\omega$-methane sulfonic acid group subsequently. This applies, for example, in the case of 1-amino-2-methoxybenzene. Diazotization of the amino-monoazo-dyestuffs of the Formula 4 can be carried out by ordinary known methods, for example, with the use of hydrochloric acid and sodium nitrite. The diazo-monoazo-compounds so obtained are then coupled with the end components in an alkaline medium, for example, a medium rendered alkaline with an alkali carbonate, if desired, with the addition of an agent assisting coupling such as pyridine or picoline.

The treatment with the agent yielding copper or nickel can also be carried out by the ordinary known methods. The metallization can be carried out in some cases, for example, with salts or divalent nickel or copper in a weakly acid aqueous medium. However, the dyestuffs can also be metallized by the known method in which metallization with the use of a nickel or copper tetrammine complex is carried out in the presence or absence of an excess of an amine or ammonia in an aqueous medium for several hours in the vicinity of 100° C. Of special advantage in some cases is the process in which the treatment is carried out in the presence of an hydroxyalkylamine, more especially ethanolamine, or a complex copper compound derived therefrom.

The new metalliferous azo dyestuffs of the present invention correspond to the general formula (7) 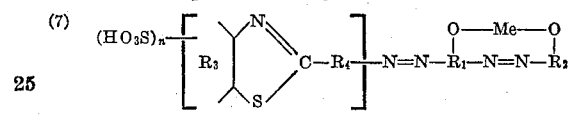

in which Me represents nickel or copper, $R_1$ represents an aromatic radical containing at the most ten nuclear carbon atoms and only six-membered carbocyclic rings to which radical the azo linkages are bound in para-position relatively to one another and the —O—Me—O-group is bound in ortho-position, relatively to $$-N=N-R_2$$

$R_2$ represents a naphthalene radical to which the azo group is bound in ortho position relatively to the —O—Me-group, $R_3$ represents a benzene radical fused on to the thiazole ring in the manner indicated, $R_4$ represents a benzene radical bound to the azo-linkage in para-position relatively to the bond connecting $R_4$ to the thiazole ring and $n$ represents a whole number of at most two.

With regard to the formulae of the metalliferous dyestuffs it should be explained that these formulae (see for example, Formula 7) undoubtedly represent the correct stoichiometric quantities of metal and the correct position of the nickel or copper atom in the complex, but the distribution of the main and secondary valences in the complex union of the metal has not yet been established with certainty.

The new metalliferous dyestuffs obtainable by the present process and corresponding to the Formula 7 can be used for dyeing and printing a very wide variety of materials such as wool, silk, leather, and especially cellulose-containing fibers such as cotton, linen and also artificial silk and staple fibers of regenerated cellulose. There are obtained dyeings distinguished by their especially interesting tints and in general by unexpectedly good properties of fastness, especially fastness to light.

The following examples illustrate the invention, the parts and percentages being by weight:

EXAMPLE 1

32 parts of 2-(4'-aminophenyl)-6-methylbenzthiazole-X-sulfonic acid (obtainable by sulfonating 2-(4'-aminophenyl)-6-methylbenzthiazole with sulfuric acid containing sulfur trioxide) are dissolved in 200 parts of water with the addition of 5.3 parts of anhydrous sodium carbonate, and then mixed with 6.9 parts of sodium nitrite. The solution is slowly run into a mixture of 30 parts of hydrochloric acid of 30 percent strength, 100 parts of water and 100 parts of ice. The whole is stirred for one hour, and then the suspension of the diazo compound, after extensive neutralization with sodium bicarbonate, is introduced into a solution of 21.7 parts of 1-amino-2- methoxybenzene-ω-methane sulfonic acid containing an excess of sodium acetate. The whole is stirred at 10° C. until the coupling is finished. The monoazo-dyestuff is then separated and hydrolyzed by heating it for 2 hours at 90° C. with sodium hydroxide solution of 4 percent strength. After cooling to 40° C., the precipitated amino-monoazo-dyestuff is filtered off, dissolved or suspended in water, then mixed with 8 parts of sodium nitrite, and further diazotized by pouring in 30 parts of hydrochloric acid of 30 percent strength. The whole is stirred for 2 hours at about 35° C., and the diazo compound is coupled at 5-10° C. in a solution rendered alkaline with sodium carbonate or sodium bicarbonate with 23 parts of 2-hydroxynaphthalene-6-sulfonic acid. When coupling is complete, the disazo dyestuff is salted out and filtered off.

The dyestuff paste is dissolved in 1500 parts of water with the addition of 15 parts of monoethanolamine and with the solution there is admixed an ammoniacal solution of copper sulfate (corresponding to 27.5 parts of $CuSO_4 \cdot 5H_2O$). The whole is refluxed at 95° C. for 6 to 8 hours. The resulting copper complex compound is salted out, filtered off and dried. There is obtained a gray powder which dissolves in water with a violet coloration and dyes cellulose fibers violetish gray tints which are distinguished above all by their very good fastness to light.

EXAMPLE 2

The diazo compounds prepared as described in Example 1 from 32 parts of 2-(4'-aminophenyl)-6-methyl-benzthiazole-X-sulfonic acid (dehydrothiotoluidine sulfonic acid) is coupled with a neutral solution of 25.3 parts of 1-amino-2-methoxynaphthalene-6-sulfonic acid and the mineral acid liberated during the coupling is neutralized by the gradual addition of sodium acetate. After several hours' stirring at 10-15° C. the coupling is complete. By the addition of ammonium hydroxide solution, the reaction mass is rendered weakly alkaline, whereby the monoazo dyestuff is caused to dissolve partially, and there are then admixed 8 parts of sodium nitrite. At 40° C., 50 parts of hydrochloric acid of 30 percent strength are added to the suspension in one portion. The whole is stirred for 1 to 2 hours at 40-45° C. and the diazo compound then filtered off with suction. The latter compound is slurried in water and the suspension introduced into a solution, cooled to 10° C. of 23 parts of 1-hydroxynaphthalene-4-sulfonic acid, 40 parts of anhydrous sodium carbonate, 200 parts of pyridine or picoline, and 200 parts of water. When coupling is complete, the disazo dyestuff is precipitated by the addition of sodium chloride and converted into the complex copper compound in the manner described in the preceding example. On working up and drying there is obtained a gray-black powder which dissolves in water with a green-gray coloration and dyes cellulose fibers green-gray tints which are very fast to light.

EXAMPLE 3

The diazo compound obtained from 32 parts of 2-(4'-aminophenyl)-6-methylbenzthiazole-X-sulfonic acid is coupled in an acetic acid medium with 13.7 parts of 1-amino-2-methoxy-5-methylbenzene. The resulting monoazo dyestuff is separated, stirred in 800 parts of water, and neutralized with sodium hydroxide solution. 8 parts of sodium nitrite are then admixed and 40 parts of concentrated hydrochloric acid added in one portion. The whole is slowly heated to 50° C. and stirred for 2 hours, after which the completely precipitated brown-orange diazo compound is filtered off and then stirred again in 500 parts of water. Coupling is effected with 22 parts of 1-hydroxynaphthalene-4-sulfonic acid in a solution rendered alkaline with sodium carbonate. The coupling reaction is much accelerated by the addition of pyridine. The dyestuff is isolated and converted into the copper complex by the method described in Example 1. After being worked up and dried it is a black-gray powder. It dyes cotton gray tints fast to light.

Other valuable cupriferous dyestuffs are obtained by converting into the copper complex compound by the method described in Example 1 a disazo dyestuff obtainable from an initial component mentioned in column I, a middle component given in column II and an end component given in column III of the following table.

| | I<br>Initial components | II<br>Middle components | III<br>End components | IV<br>Tints on cotton with the complex copper compounds |
|---|---|---|---|---|
| 1 | 2-(4'-aminophenyl)-6-methylbenzthiazole-X-sulfonic acid (dehydrothiotoluidine sulfonic acid) | 1-amino-2-methoxy-benzene | 1-hydroxynaphthalene-4-sulfonic acid | Bluish gray. |
| 2 | do | do | 1-hydroxynaphthalene-5-sulfonic acid | Greenish gray. |
| 3 | do | do | 1-hydroxynaphthalene-3-sulfonic acid | Blue-gray. |
| 4 | do | do | 1-hydroxynaphthalene-3,6-disulfonic acid | Bluish gray. |
| 5 | do | do | 1-hydroxynaphthalene-3,8-disulfonic acid | Greenish blue-gray. |
| 6 | 2-(4'-aminophenyl)-6-methylbenzthiazole-3'-sulfonic acid | do | 1-hydroxynaphthalene-4-sulfonic acid | Bluish gray. |
| 7 | do | do | 1-hydroxynaphthalene-5-sulfonic acid | Greenish gray. |
| 8 | 2-(4'-aminophenyl)-benzthiazole-X-sulfonic acid | do | 1-hydroxynaphthalene-4-sulfonic acid | Bluish gray. |
| 9 | 2-(4'-aminophenyl)-5-chlorobenzthiazole-X-sulfonic acid | do | 2-hydroxynaphthalene-4-sulfonic acid | Do. |
| 10 | 2-(4'-aminophenyl)-5-methylbenzthiazole-X,3'-disulfonic acid | do | 1-hydroxynaphthalene-4-sulfonic acid | Blue-gray. |
| 11 | do | do | 1-hydroxynaphthalene-5-sulfonic acid | Greenish gray. |
| 12 | 2-(4'-aminophenyl)-6-methylbenzthiazole-X-sulfonic acid | 1-amino-2-methoxynaphthalene-6-sulfonic acid. | 1-hydroxynaphthalene-3-sulfonic acid | Bluish green. |
| 13 | do | do | 1-hydroxynaphthalene-5-sulfonic acid | Do. |
| 14 | do | do | 2-hydroxynaphthalene-4-sulfonic acid | Green. |
| 15 | do | do | 2-hydroxynaphthalene-6-sulfonic acid | Bluish gray. |
| 16 | do | do | 2-hydroxynaphthalene-7-sulfonic acid | Do. |
| 17 | do | do | 1-hydroxynaphthalene-3,6-disulfonic acid | Green. |
| 18 | do | do | 2-hydroxynaphthalene-3,8-disulfonic acid | Do. |
| 19 | do | 1-amino-2-methoxy-5-methylbenzene. | 1-hydroxynaphthalene-3,6-disulfonic acid | Green-gray. |
| 20 | do | 1-amino-2-methoxy-naphthalene-7-sulfonic acid. | do | Green. |
| 21 | do | do | 1-hydroxynaphthalene-3,8-disulfonic acid | Do. |

EXAMPLE 4

The diazo-azo compound obtained as described in Example 1 from 32 parts of 2-(4'-aminophenyl)-6-methyl-benzthiazole-X-sulfonic acid and 21.7 parts of 1-amino-2-methoxybenzene-ω-methane sulfonic acid is coupled with 35 parts of 2-phenylamino-8-hydroxy-naphthalene-6-sulfonic acid-3'-carboxylic acid. Coupling is strongly accelerated by the addition of pyridine or picoline. When the coupling is finished the disazo-dyestuff is salted out and filtered off.

The dyestuff paste is dissolved in 1500 parts of water with the addition of 30 parts of monoethanolamine, and the solution is mixed with an ammoniacal solution of copper sulfate (corresponding to 27.5 parts of $CuSO_4.5H_2O$). The whole is treated under reflux for 6–8 hours at 95° C. The resulting complex copper compound of the formula

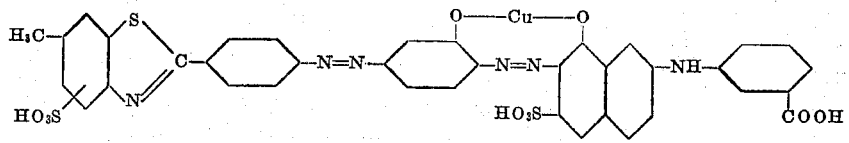

is salted out, filtered off and dried. It is a gray powder which dissolves in warm water with a blue-green coloration and dyes cotton neutral grey tints which are fast to light.

EXAMPLE 5

The diazo compound obtained as described in Example 1 from 32 parts of 2-(4'-aminophenyl)-6-methyl-benzthiazole-X-sulfonic acid (dehydrothiotoluidine sulfonic acid) is coupled with a hydrochloric acid solution of 13.7 parts of 1-amino-2-methoxy-5-methylbenzene, and the mineral acid is neutralized by the gradual addition of sodium acetate. After stirring for several hours at 10–15° C., the coupling mixture is acidified with hydrochloric acid and the monoazo-dyestuff formed is filtered off with suction. The dyestuff paste is stirred in about 2000 parts of water, and the mixture is rendered alkaline by the addition of sodium hydroxide and mixed with 8 parts of sodium nitrite. 50 parts of hydrochloric acid of 30 percent strength are added to the suspension in one portion at 40° C. The whole is stirred for 1–2 hours at 40–45° C., mixed with 100 parts of sodium chloride and the diazo compound is filtered off with suction. The latter is suspended in water and the suspension is introduced into a solution, cooled to 10° C., of 39 parts of 2-phenylamino-8-hydroxynaphthalene-6:3'-disulfonic acid, 40 parts of anhydrous sodium carbonate, 40 parts of pyridine or picoline and 200 parts of water. When the coupling is finished the disazo-dyestuff is salted out, filtered off, and converted into the complex copper compound as described in Example 4. After being worked up and dried, the complex copper compound is a grey-black powder which dissolves in warm water with a blue green coloration and dyes cotton green-grey tints.

Further valuable cupriferous dyestuffs are obtained by converting into their complex compounds in the manner described in Example 1 or 2 the disazo dyestuffs given in the following Table II and obtainable from the initial components given in column I, the middle components given in column II and the end components given in column III.

*Table II*

| | I Initial components | II Middle components | III End components | IV Tints on cotton with the complex copper compounds |
|---|---|---|---|---|
| 1 | 2-(4'-aminophenyl)-6-methylbenzthiazole-X-sulfonic acid (dehydrothiotoluidine sulfonic acid). | 1-amino-2-methoxybenzene | 2-phenylamino-8-hydroxy-naphthalene-6:3'-disulfonic acid. | Grey. |
| 2 | do | do | 2-phenylamino-8-hydroxynaphthalene-6-sulfonic acid-4'-carboxylic acid. | Do. |
| 3 | do | do | 2-phenylamino-8-hydroxynaphthalene-6-sulfonic acid. | Do. |
| 4 | do | do | 2-phenylamino-8-hydroxynaphthalene-6-sulfonic acid-3'-sulfonic acid amide. | Do. |
| 5 | do | do | 2-amino-8-hydroxynaphthalene-6-sulfonic acid. | Greenish grey. |
| 6 | do | do | 2-(β-hydroxyethylamino)-8-hydroxynaphthalene-6-sulfonic acid. | Grey. |
| 7 | do | do | 2-methylamino-8-hydroxynaphthalene-6-sulfonic acid. | Do. |
| 8 | do | do | 2-acetylamino-5-hydroxynaphthalene-7-sulfonic acid. | Bluish grey. |
| 9 | 2-(4'-aminophenyl)-benzthiazole-X-sulfonic acid | do | 2-phenylamino-8-hydroxynaphthalene-6-sulfonic acid-3'-carboxylic acid. | Grey. |
| 10 | 2-(4'-aminophenyl)-5-chlorobenzthiazole-X-sulfonic acid. | do | 2-phenylamino-8-hydroxynaphthalene-6:3'-disulfonic acid. | Do. |
| 11 | 2-(4'-aminophenyl)-6-methylbenzthiazole-3'-sulfonic acid. | 1-amino-2-methoxybenzene | 2-phenylamino-8-hydroxynaphthalene-6-sulfonic acid-3'-carboxylic acid. | Do. |
| 12 | do | do | 2-phenylamino-8-hydroxynaphthalene-6:3'-disulfonic acid. | Do. |
| 13 | do | do | 2-acetylamino-8-hydroxynaphthalene-6-sulfonic acid. | Greenish grey. |
| 14 | 2-(4'-aminophenyl)-6-methylbenzthiazole-X:3'-disulfonic acid. | do | 2-phenylamino-8-hydroxynaphthalene-6-sulfonic acid. | Grey. |
| 15 | do | do | 2-methyl-2-phenyl-amino-8-hydroxynaphthalene-6-sulfonic acid. | Do. |
| 16 | do | do | 2-phenylamino-8-hydroxynaphthalene-6-sulfonic acid. | Do. |
| 17 | do | do | 2-phenylamino-8-hydroxynaphthalene-6:3'-disulfonic acid. | Do. |
| 18 | do | do | 2-phenylamino-8-hydroxynaphthalene-6-sulfonic acid-3'-carboxylic acid. | Grey blue. |
| 19 | 2-(4'-aminophenyl)-6-methylbenzthiazole-X-sulfonic acid. | 1-amino-2-methoxy-5-methylbenzene. | 2-acetylamino-5-hydroxynaphthalene-7-sulfonic acid. | Greenish blue-grey. |
| 20 | do | 1-amino-2-methoxybenzene | do | Greenish blue. |
| 21 | do | 1-amino-2:5-di-methoxybenzene. | 2-(4'-carboxymethoxyphenylamino)-5-hydroxynaphthalene-7-sulfonic acid. | Olive. |
| 22 | do | do | 2-phenylamino-8-hydroxynaphthalene-6-sulfonic acid-3'-carboxylic acid. | Grey. |
| 23 | do | 1-amino-2-methoxynaphthalene-6-sulfonic acid. | 2-phenylamino-8-hydroxynaphthalene-6:4'-disulfonic acid. | Green. |
| 24 | do | 1-amino-2-methoxybenzene | 2-acetylamino-5-hydroxynaphthalene-7-sulfonic acid. | Grey. |

EXAMPLE 6

The disazo-dyestuff (copper-free) obtained in the form of a paste as described in Example 4 is dissolved in 1500 parts of warm water with the addition of 15 parts of monoethanolamine, and the solution is heated with an ammoniacal solution of 28 parts of crystalline nickel sulfate for 10 hours under reflux at 90–95° C., and then the complex nickel compound is precipitated by the addition of sodium chloride and filtered off. After drying there is obtained a dark powder which dyes cotton brownish grey tints.

EXAMPLE 7

The diazo-azo-compound obtained as described in Example 1 from 32 parts of 2-(4′-aminophenyl)-6-methyl-benzthiazole-X-sulfonic acid and 21.7 parts of 1-amino-2-methoxybenzene-ω-methane-sulfonic acid is coupled with 28.5 parts of 1-acetylamino-8-hydroxynaphthalene-4-sulfonic acid. The coupling is much accelerated by the addition of pyridine or picoline. When the coupling is complete, the disazo dyestuff is salted out and filtered off.

The dyestuff paste is dissolved in 1500 parts of water with the addition of 15 parts of monoethanolamine and the solution admixed with an ammoniacal solution of copper sulfate (corresponding to 27.5 parts of $CuSO_4.5H_2O$). The whole is refluxed at 95° C. for 6 to 8 hours. The resulting copper complex compound is salted out, filtered off and dried. There is obtained a gray powder which dissolves in water with a green-gray coloration and dyes cotton olive gray tints which are fast to light.

By using 1-amino-8-hydroxynaphthalene-4-sulfonic acid or 1-amino-8-hydroxynaphthalene-2,4-disulfonic acid instead of 1-acetylamino-8-hydroxynaphthalene-4-sulfonic acid, there are obtained dyestuffs with similar properties, the complex copper compounds of which dye cellulose fibers considerably greener and purer tints.

EXAMPLE 8

The diazo compound obtained according to Example 1 from 32 parts of 2-(4′-aminophenyl)-6-methyl-benzthiazole-X-sulfonic acid (dehydrothiotoluidine sulfonic acid) is coupled with a neutral solution of 25.3 parts of 1-amino-2-methoxynaphthalene-6-sulfonic acid and the mineral acid liberated during the coupling is neutralized by the gradual addition of sodium acetate. After several hours' stirring at 10 to 15° C., the coupling is complete. By the addition of ammonium hydroxide solution, the reaction mass is rendered weakly alkaline, whereby the monoazo dyestuff is caused to dissolve partially, and there are then admixed 8 parts of sodium nitrite. At 40° C., 50 parts of hydrochloric acid of 30 percent strength are added to the suspension in one portion. The whole is stirred for 1 to 2 hours at 40–45° C. and the diazo compound then filtered off with suction. The latter compound is slurried in water and the suspension introduced into a solution, cooled to 10° C., of 28.5 parts of 1-acetylamino-8-hydroxynaphthalene-4-sulfonic acid, 40 parts of anhydrous sodium carbonate, 200 parts of pyridine or picoline, and 200 parts of water. When coupling is complete the disazo dyestuff is salted out, filtered off and converted into the complex copper compound by the process described in Example 1. After being worked up and dried the product is a gray-black powder which dissolves in water with a blue-green coloration and dyes cotton blue-greenish olive tints.

A dyestuff with very similar properties and dyeing cotton somewhat more yellowish olive tints is obtained when there is used as coupling component the 1-benzoyl-amino-8-hydroxynaphthalene-4-sulfonic acid instead of the 1-acetylamino-8-hydroxynaphthalene-4-sulfonic acid.

EXAMPLE 9

100 parts of cotton are entered at 40° C. into a dyebath which contains in 3000 parts of water, 0.5 part of the cupriferous disazo-dyestuff obtainable as described in the second paragraph of Example 4. Dyeing is carried on for one hour while raising the temperature to 90° C., 30 parts of crystalline sodium sulfate are added, and dyeing is continued for a further ½ hour at 90–95° C. The cotton is then rinsed and finished in the usual manner. It is dyed a grey tint, and the dyeing is distinguished by very good fastness to light.

What is claimed is:

1. A metalliferous azo-dyestuff which contains at least two sulfonic acid groups and corresponds to the formula

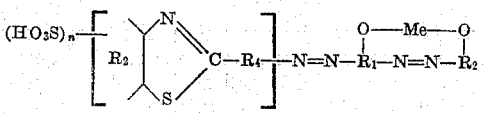

in which Me represents a metal having an atomic number from 28 to 29, $R_1$ represents an aromatic radical containing at the most ten nuclear carbon atoms and only six-membered carbocyclic rings, to which radical the two azo linkages are bound in para-position relatively to one another and the —O—Me—O-group is bound in ortho-position relatively to —N=N—$R_2$, $R_2$ represents a naphthalene radical bound to the —O—Me—O-group in ortho-position relatively to the azo linkage, $R_3$ represents a benzene radical fused on to the thiazole ring in the manner indicated, $R_4$ represents a benzene radical bound to the azo linkage in para-position relatively to the bond connecting $R_4$ with the thiazole ring, and $n$ represents a whole number of at the most 2.

2. A metalliferous azo-dyestuff of the formula

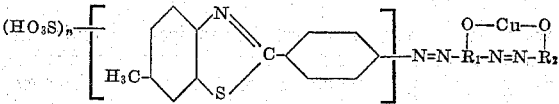

in which $R_1$ represents an aromatic radical containing at the most ten nuclear carbon atoms and only six-membered carbocyclic rings, to which radical the two azo linkages are bound in para-position relatively to one another and the —O—Cu-group is bound in ortho position relatively to —N=N—$R_2$, $R_2$ represents a naphthalene radical substituted by at least one sulfonic acid group and bound to the —O—Cu—O-group in ortho-position relatively to the azo linkage, and $n$ represents a whole number of at the most 2.

3. A metalliferous azo-dyestuff of the formula

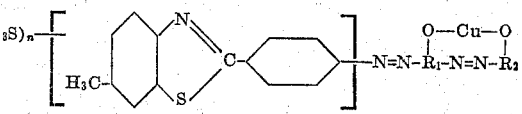

in which $R_1$ represents an aromatic radical containing at the most ten nuclear carbon atoms and only six-membered carbocyclic rings to which radical the two azo linkages are bound in para-position relatively to one another and the —O—Cu-group is bound in ortho position relatively to —N=N—$R_2$, $R_2$—O— represents the radical of an amino-hydroxynaphthalene-sulfonic acid, $R_2$ being bound to the —O—Cu-group in ortho-position relatively to the azo group and $n$ represents a whole number of at the most 2.

4. A metalliferous azo-dyestuff of the formula

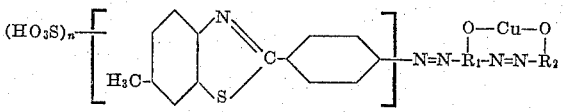

in which $R_1$ represents an aromatic radical containing at the most ten nuclear carbon atoms and only six-membered carbocyclic rings to which radical the two azo linkages are bound in para-position relatively to one another and the —O—Cu-group is bound in ortho position relatively to —N=N—$R_2$, $R_2$—O— represents the radical of a 1-hydroxynaphthalene-3-sulfonic acid bound in its 2-position to the azo linkage and containing in a β-position an amino group, and n represents a whole number of at the most 2.

5. A metalliferous azo-dyestuff of the formula

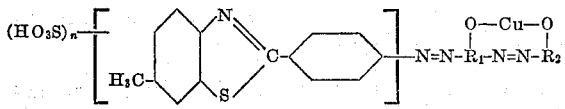

in which $R_1$ represents an aromatic radical containing at the most ten nuclear carbon atoms and only six-membered carbocyclic rings to which radical the two azo linkages are bound in para-position relatively to one another and the —O—Cu-group is bound in ortho position relatively to —N=N—$R_2$, $R_2$—O— represents the radical of a 1-amino-hydroxy-naphthalene-sulfonic acid, $R_2$ being bound to the —O—Cu-group in ortho-position relatively to the azo group and n represents a whole number of at the most 2.

6. A metalliferous azo-dyestuff of the formula

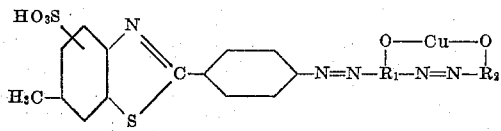

in which $R_1$ represents an aromatic radical containing at the most ten nuclear carbon atoms and only six-membered carbocyclic rings to which radical the two azo linkages are bound in para-position relatively to one another and the —O—Cu-group is bound in ortho position relatively to —N=N—$R_2$, and $R_2$—O— represents the radical of a 1-hydroxynaphthalene-3-sulfonic acid bound in its 2-position to the azo linkage and containing in a β-position an amino group.

7. A metalliferous azo-dyestuff of the formula

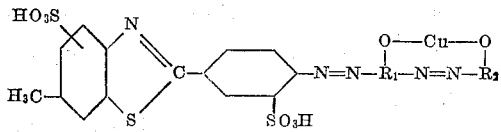

in which $R_1$ represents an aromatic radical containing at the most ten nuclear carbon atoms and only six-membered carbocyclic rings to which radical the two azo linkages are bound in para-position relatively to one another and the —O—Cu-group is bound in ortho position relatively to —N=N—$R_2$, and $R_2$—O— represents the radical of a 1-hydroxy-naphthalene-3-sulfonic acid bound in its 2-position to the azo linkage and containing in a β-position an amino group.

8. A metalliferous azo-dyestuff of the formula

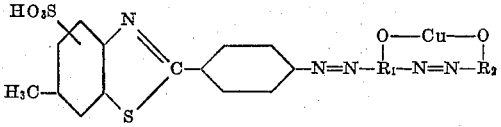

in which $R_1$ represents an aromatic radical containing at the most ten nuclear carbon atoms and only six-membered carbocyclic rings to which radical the two azo linkages are bound in para-position relatively to one another and the —O—Cu-group is bound in ortho position relatively to —N=N—$R_2$, and $R_2$—O— represents the radical of a 1-amino-hydroxynaphthalene-sulfonic acid, $R_2$ being bound to the —O—Cu-group in ortho-position relatively to the azo group.

9. A metalliferous azo dyestuff of the formula

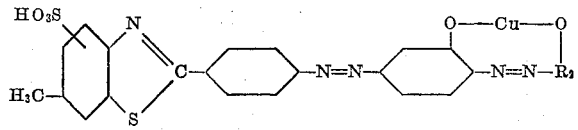

in which $R_2$—O— represents the radical of a 1-hydroxy-naphthalene-3-sulfonic acid bound in its 2-position to the azo linkage and containing in a β-position an amino group.

10. A metalliferous azo dyestuff of the formula

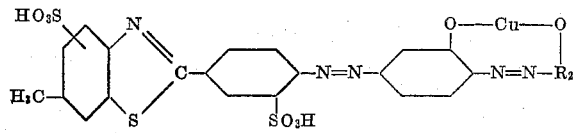

in which $R_2$—O— represents the radical of a 1-hydroxy-naphthalene-3-sulfonic acid bound in its 2-position to the azo linkage and containing in a β-position an amino group.

11. A metalliferous azo dyestuff of the formula

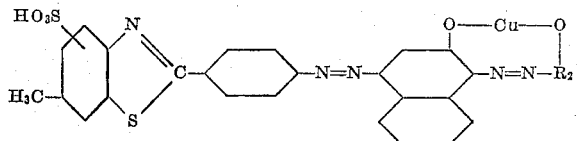

in which $R_2$—O— represents the radical of a 1-hydroxy-naphthalene-3-sulfonic acid bound in its 2-position to the azo linkage and containing in a β-position an amino group.

12. A metalliferous azo dyestuff of the formula

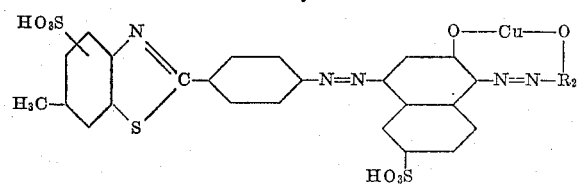

in which $R_2$—O— represents the radical of a 1-amino-8-hydroxynaphthalene-4-sulfonic acid bound in its 7-position to the azo linkage.

13. The metalliferous azo dyestuff of the formula

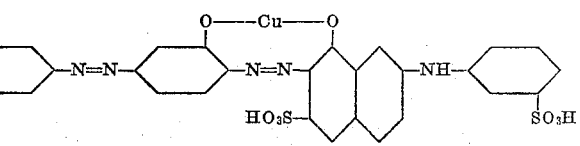

14. The metalliferous azo dyestuff of the formula

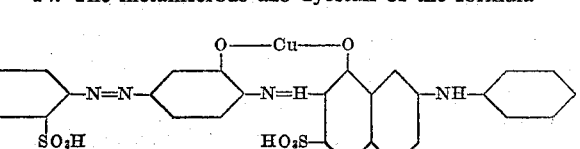

15. The metalliferous azo dyestuff of the formula
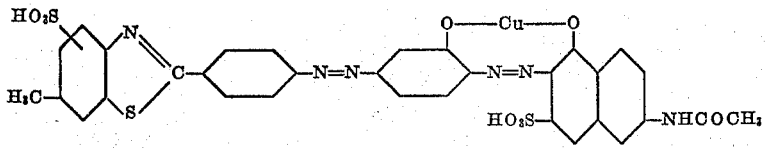
16. The metalliferous azo dyestuff of the formula
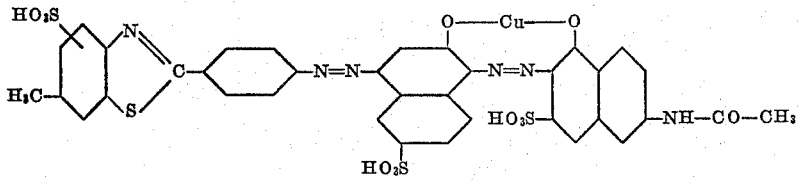
17. The metalliferous azo dyestuff of the formula
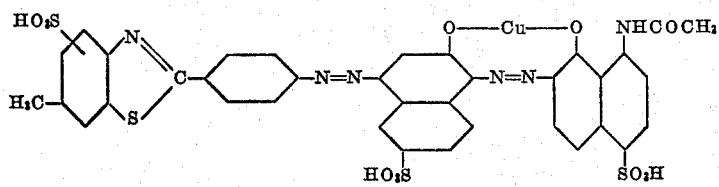
References Cited in the file of this patent
UNITED STATES PATENTS
| | | |
|---|---|---|
| 2,111,559 | Fellmer | Mar. 22, 1938 |
| 2,212,816 | Schultis et al. | Aug. 27, 1940 |
| 2,270,451 | Keller | Jan. 20, 1942 |
FOREIGN PATENTS
| | | |
|---|---|---|
| 516,459 | Belgium | June 22, 1953 |